(12) United States Patent
Baek et al.

(10) Patent No.: US 6,642,347 B1
(45) Date of Patent: Nov. 4, 2003

(54) AMINE-TERMINATED HYPERBRANCHED QUINOXALINE-AMIDE POLYMERS

(75) Inventors: Jong-Beom Baek, Beavercreek, OH (US); Loon-Seng Tan, Centerville, OH (US); John B. Ferguson, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/083,969

(22) Filed: Feb. 27, 2002

(51) Int. Cl.[7] .......................... C08G 73/00; C08G 69/00
(52) U.S. Cl. ...................... 528/310; 528/170; 528/327; 528/322; 528/332; 528/172; 528/173
(58) Field of Search ................................ 528/170, 172, 528/173, 310, 327, 322, 332

(56) References Cited

U.S. PATENT DOCUMENTS

| | | | | |
|---|---|---|---|---|
| 5,587,441 A | * | 12/1996 | Frechet et al. | 526/238 |
| 6,326,237 B1 | * | 12/2001 | Carter et al. | 438/108 |
| 6,534,600 B2 | * | 3/2003 | Dvornic et al. | 525/474 |
| 6,541,633 B1 | * | 4/2003 | Tan et al. | 544/353 |

OTHER PUBLICATIONS

"Synthesis and Propeties of Hyperbranched Aromatic Polyamides", Yang, G; Jikei, M; Kakimoto, M; Macromolecules; (1999), 32(7); pp. 2215–2220.*
"Successful Thermal Self–Polycondensation of AB2 Monomer to Form Hyperbranched Aromatic Polyamide", Yang,/G.; Jikei, M; Kakimoto, M; Macromolecules; (1998) 31(17), pp. 5969–5966.*
Jong–Beom Baek, John B. Ferguson, Patrick T. Mather, Loon–Seng Tan, *Hyperbranched Aromatic Polyamides Containing Ether and Quinoxaline Units and Their Blends with BMI*, Polymeric Materials: Science & Engineering, 2001, 84, 724–5, Published about Mar. 15, 2001.

* cited by examiner

*Primary Examiner*—P. Hampton-Hightower
(74) *Attorney, Agent, or Firm*—Charles E. Bricker; Thomas L. Kundert

(57) ABSTRACT

Amine-terminated hyperbranched quinoxaline-amide polymers having repeating units of the formula:

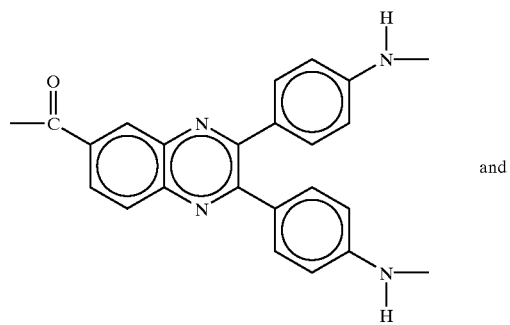

and

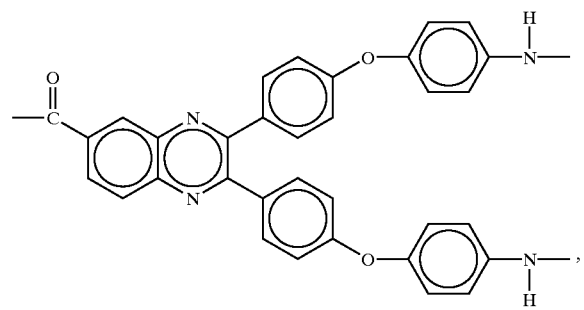

are useful to initiate bismaleimide polymerization and to increase the toughness of thermosets such as BMI and epoxies.

2 Claims, No Drawings

AMINE-TERMINATED HYPERBRANCHED QUINOXALINE-AMIDE POLYMERS

RIGHTS OF THE GOVERNMENT

The invention described herein may be manufactured and used by or for the Government of the United States for all governmental purposes without the payment of any royalty.

BACKGROUND OF THE INVENTION

The present invention relates to novel amine-terminated hyperbranched quinoxaline-amide polymers as room-temperature initiators for bismaleimide polymerization.

Historically, fabrication of high performance, organic matrix composite (OMC) structures for aircraft and space systems applications on a low volume basis is very costly. This is because nonrecurring costs such as tooling and capital, equipment are the major cost drivers for low volume production. Thus, there is a pressing need to reduce the costs of OMC structures, for both prototype and low-volume programs. Since autoclaves and hardened tooling, traditionally required for the fabrication of large, composite-based spacecraft components, have the lion's share in the fabrication cost, the affordability issue can be logically addressed by developing non-autoclave resins and processing. Toward this end, there are currently two approaches, namely, low-temperature curing and electron-beam (E-beam) curing. In the former, the objective is to drastically lower the curing temperature and pressure for composites so that tooling can be fabricated easily from relatively inexpensive materials, such as wood, fiberglass, or foam. However, for these processing conditions, the material systems (prepreg, liquid resin and adhesive) must possess characteristics that are conducive to low temperature/low pressure processing (e.g., 150° F. and 14 psi), and, after post-cure in free-standing fashion, should provide structural performance equivalent to current aerospace standards (e.g. epoxy-3501). This approach is hampered by the lack of suitable material systems that can be cured at temperatures below 65° C. to form structures with high temperature properties. An alternative approach to low-temperature thermal cure is E-beam curing. Although this method of curing is rapid (seconds to minutes as opposed to hours for thermal curing), a high-energy, electron-beam source (<250 KeV to >1 MeV) is required, necessitating some measures of personnel protection.

Bismaleimide (BMI) resins are attractive for composite applications because such resins can be processed and fabricated similar to epoxies and their use temperatures are much higher. However, the curing temperatures of BMI are generally in excess of 200° C. Therefore, it is desirable to lower the polymerization temperatures to below 65° C. and at the same time preserve the high temperature properties from conventional thermal cure of BMI resins.

Dendritic macromolecules such as dendrimers and hyperbranched polymers are a new class of highly branched polymers that have distinctly different properties from their linear analogs Both dendrimers and hyperbranched polymers have much lower solution and melt viscosities than their linear analogs of similar molecular weights. They also have a large number of chain-ends whose collective influence dictates their overall physical and/or chemical behaviors. These features are attractive in terms of processability and offer flexibility in engineering-required properties for specific applications.

Hyperbranched polymers have an important and practical advantage over dendrimers at the "raw material" level. Although dendrimers have precisely controlled structures (designated as generations), their preparations generally involve tedious, multi-step sequences that are impractical and costly in scale-up production. Synthesis of a hyperbranched polymer, on the other hand, is a one-pot process. Large quantities of hyperbranched polymers can be easily produced from $AB_x$ ($x \geq 2$) monomers.

Accordingly, it is an object of the present invention to provide novel amine-terminated hyperbranched quinoxaline-amide polymers.

Another object is to provide novel amine-terminated hyperbranched quinoxaline-amide polymers as room-temperature initiators for bismaleimide polymerization.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided amine-terminated hyperbranched quinoxaline-amide polymers having the repeating units:

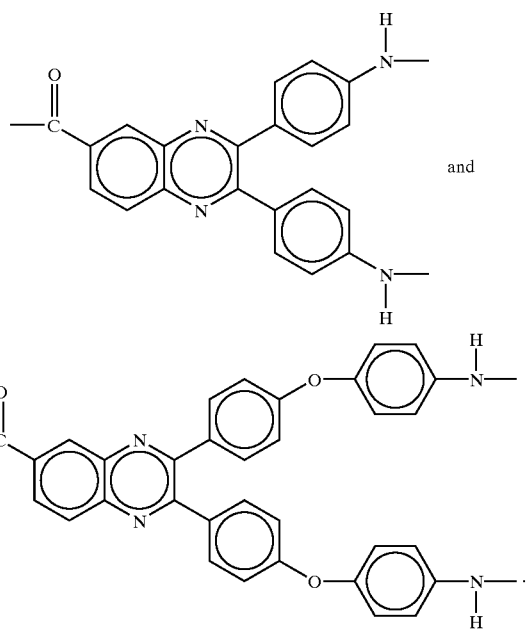

DETAILED DESCRIPTION OF THE INVENTION

The amine-terminated hyperbranched quinoxaline-amide polymers of this invention are prepared by the direct polycondensation of the following monomers via the Yamazaki reaction:

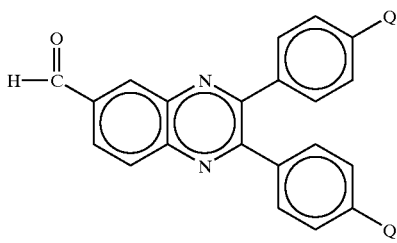

wherein Q is —NH₂ or

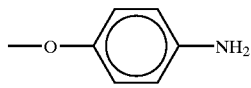

Preparation of these monomers is described in co-pending application Ser. No. 10/083,963, filed of even date herewith, titled QUINOXALINE-CONTAINING AB₂ MONOMERS FOR HYPERBRANCHED AROMATIC POLYAMIDES.

Aromatic polyamides are prepared via two general routes: (i) polycondensation reaction via an aromatic diacid chloride and a diamine and (ii) direct polycondensation reaction of a dicarboxylic acid and a diamine. For route (i), because of the extreme moisture sensitivity of diacid chlorides and the highly exothermic nature of the reaction between an amine and a carboxylic acid chloride, the polymerization is usually conducted at temperatures at or below 0° C. and under inert atmosphere. In addition, in order to consistently achieve high molecular weight for the resulting polyamides, the diacid chloride monomers must be freshly purified prior to polymerization. For route (ii), since the dicarboxylic acid monomers are cheaper, much less sensitive to moisture and relatively easy to purify via recrystallization, the polycondensation is more amenable to scale-up. However, because of little or no formation of amide from a carboxylic acid and an amine under ambient conditions, a phosphorus (V)-based promoter is used to activate the carboxylic group. The Yamazaki reaction embodies the most commonly used conditions that entail triphenyl phosphite (TPP) in N-methylpyrrolidinone (NMP) solution containing lithium chloride or calcium chlorides at 100° C.

The polymers can be employed to initiate bismaleimide polymerization. Another application of these polymers is to increase the toughness of thermosets such as BMI and epoxies. By the term toughness is meant resistance to impact induced damage. Toughness in cured neat resin samples may be assessed by the critical stress intensity factor, $K_{1C}$, among others. Toughness in fiber reinforced composites prepared by laying up and subsequently curing numerous plies of prepregs is best assessed by measuring the compression strength after an impact of suitable energy. Generally, an impact of 1500 in-lb/in is used, and compression after impact (CAI) values measured in accordance with Boeing test BSS 7260 on a quasiisotropic $[+45/0/-45190]_{4s}$ layup. Alternatively, other measures of toughness such as laminate $G_{//C}$ are used.

The following examples illustrate the invention. Known compound 3,5-bis(4-aminophenyioxy)benzoic acid was prepared and polymerized for comparison with the polymers of this invention.

EXAMPLE 1

3,5-bis(4-Nitrophenyloxy)benzoic Acid

Into a 500 mL three-necked, round-bottomed flask equipped with a magnetic stirrer, nitrogen inlet, and a condenser, 4-fluoronitrobenzene (30.0 g, 0.21 mol), 3,5-dihydroxybenzoic acid (15.4 g, 0.10 mol), potassium carbonate (50.0 g, 0.36 mol), and NMP (250 mL) were placed. The reaction mixture was then heated and maintained between 120° C. to 140° C. for 8 h. The dark solution was filtered while it was still warm and the filtrate was poured into distilled water containing 5% hydrochloric acid. The resulting precipitates was collected by suction filtration and air-dried. Brown solid was recrystallized from hot acetic acid to afford 39.6 g (91% yield) of brown crystals, mp 228–229° C. Anal. Calcd. for $C_{19}H_{12}N_2O_8$: C, 57.58%; H, 3.05%; N, 7.07%; O, 32.30%. Found: C, 57.45%; H, 2.74%; N, 6.96%; O, 33.46%. FT-IR (KBr, cm⁻¹): 1105, 1350, 1454, 1625. Mass spectrum (m/e): 396 (M⁺, 100% relative abundance). ¹H-NMR (DMSO-d₆, δ in ppm): 7.29–7.34 (d, 4H, Ar), 7.38–7.40 (t, 1H, Ar), 7.50–7.51 (s, 2H, Ar), and 8.26–8.32 (d, 4H, Ar). ¹³C-NMR (DMSO-d₆, δ in ppm): 116.67, 118.38, 126.19, 134.77, 142.98, 156.22, 161.67, 165.58.

EXAMPLE 2

3,5-bis(4-Aminophenyloxy)benzoic Acid

Into a 500 mL high pressure bottle, 3,5-bis(4-nitrophenyloxy)benzoic acid (15.0 g, 38 mmol), palladium on activated carbon (10%, 0.5 g), and a mixture of ethanol (150 mL) and acetone (50 mL) were introduced. The bottle was placed on a Parr hydrogenator. Hydrogen was charged and discharged five times and the reaction mixture was agitated at 60–65 psi for 24 h. After the final reaction mixture had been filtered through a cake of Celite 545 to remove catalyst, the solvent of the filtrate was removed on a rotovap. The orange residue was recrystallized from deoxygenated 90% 2-propanol to give 10.65 g(83.7% yield) of brown crystals, mp=228–230° C. (free amine, dec.), 245° C. (dihydrochloric salt⁴, dec.). Anal. Calcd. for $C_{19}H_{16}N_2O_4$: C, 67.85%; H, 4.79%; N, 8.33%; O, 19.03%. Found: C, 66.44%; H, 6.25%; N, 6.97%; O, 19.70%. FT-IR (KBr, cm⁻¹): 1594, 3412. Mass spectrum (m/e): 336 (M⁺, 100% relative abundance). ¹H-NMR (DMSO-d₆, δ in ppm): 6.63–6.67 (d, 4H, Ar), 6.69–6.71 (t, 1H, Ar), 6.81–6.87 (d, 4H, Ar), 6.97–6.98 (d, 2H, Ar). ¹³C-NMR (DMSO-d₆, δ in ppm): 108.88, 109.54, 114.90, 121.29, 133.04, 144.59, 145.91, 160.43, 166.45.

EXAMPLE 3

Hyperbranched Polyamide Derived From 3,5-bis(4-Aminophenyloxy)benzoic Acid (Polymer PI) (For Comparison Purposes)

Into a 100 mL three-necked, round-bottomed flask equipped with a magnetic stirrer and nitrogen inlet, 3,5-bis(4-aminophenyloxy)benzoic acid (3.0 g., 8.9 mmol), triphenyl phosphite (7 mL), pyridine (5 mL), and freshly distilled N-methyl-2-pyroridinone (40 mL) were placed and the reaction mixture was heated to 80° C. and maintained at this temperature for 12 h. After dark brown mixture was allowed to cool down to room temperature, it was poured into a deoxygenated mixture of methanol and acetic acid (1/1, v/v). The resulting white precipitate was collected by suction filtration and dried under reduced pressure (1 mmHg) at 100° C. for 200 h. It has [η]=0.19 dL/g (NMP at 30±1° C.) and glass transition temperature (Tg)=245° C. Thermogravemetric analysis result indicates that it is stable in air up to 360° C. and in helium up to 359° C.

EXAMPLE 4

Hyperbranched Polyamide Derived From 2,3-bis(4-Aminophenyl)-quinoxaline-6-carboxylic Acid (Polymer PII)

Into a 100 mL three-necked round-bottomed flask equipped with a magnetic stirrer and nitrogen inlet, 2,3-bis (4-aminophenyl)-quinoxaline-6-carboxylic acid (3.0 g., 8.4 mmol), triphenyl phosphite (7 mL), pyridine (5 mL), and freshly distilled N-methyl-2-pyroridinone (40 mL) were placed and the reaction mixture was heated to 80° C. and maintained at this temperature for 12 h. After the dark brown mixture had been allowed to cool down to room temperature, it was poured into a deoxygenated mixture of methanol and acetic acid (1/1, v/v). The resulting white precipitate was collected by suction filtration and dried under reduced pressure (1 mmHg) at 100° C. for 200 h. It has [η]=0.19 dL/g (NMP at 30±1° C.) and glass transition temperature (Tg)=252° C. Thermogravemetric analysis result indicates that it is stable in air up to 502° C. and in helium up to 532° C.

EXAMPLE 5

Hyperbranched Polyamide Derived From 2,3-bis(4-Aminophenyloxyphenyl)-quinoxaline-6-carboxylic Acid (Polymer PIII)

Into a 100 mL three-necked round bottom flask equipped with a magnetic stirrer and nitrogen inlet, 2,3-bis(4-aminophenyloxyphenyl)-quinoxaline-6-carboxylic acid (4.5 g., 8.3 mmol), triphenyl phosphite (7 mL), pyridine (5 mL), and freshly distilled N-methyl-2-pyroridinone (40 mL) were placed and the reaction mixture was heated to 80° C. and maintained at this temperature for 12 h. After the dark brown mixture had been allowed to cool down to room temperature, it was poured into a deoxygenated mixture of methanol and acetic acid (1/1, v/v). The resulting white precipitate was collected by suction filtration and dried under reduced pressure (1 mmHg) at 100° C. for 200 h. The insolubility of this hyperbranched polymer in common organic solvents precluded the viscosity determination. It did not show any glass transition under differential scanning calorimetric conditions. Thermogravemetric analysis result indicates that it is stable in air up to 523° C. and in helium up to 532° C.

EXAMPLE 6

Polymer Properties
Self-Polymerization of $AB_2$ Monomers

Direct polycondensation via Yamazaki reaction was conducted following literature procedures. The hyperbranched polymers were obtained as white (PI) or light brown (PII & PIII) powders. They were washed carefully and dried at reduced pressure (1 mm Hg) at 100° C. for 200 h prior to characterization.
Solution Properties Polymers PI and PII were soluble in polar aprotic solvents, such as DMF, DMAc, NMP, and DMSO.
Thermal Properties The glass-transition temperatures ($T_g$'s) of hyperbranched polymers were obtained from differential scanning calorimetry (DSC) experiments. Prior to DSC experiments, the powder samples were heated to 250° C. and cooled to room temperature. The glass transition temperature is defined as the mid-point of the maximum baseline shift at second run. As shown in Table 1, amine-terminated hyperbranched polymers displayed $T_g$'s in the range of 245–252° C. Thermal and thermo-oxidative stabilities of the hyperbranched polymers (powder samples) were indicated by temperature at which a 5% weight losses in the range of 359–532° C. in helium and 360–523° C. in air, respectively from thermogravimetric analysis (TGA) experiments.

TABLE 1

Properties of amine-terminated and carboxyl-terminated hyperbranched polymers

| Polymer | [η] (dL/g)[a] | $T_g$ (° C.)[b] | $T_{d5\%}$ (° C.)[c] | |
|---|---|---|---|---|
| | | | In Air | In Helium |
| PI | 0.19 | 245 | 360 | 359 |
| PII | 0.19 | 252 | 502 | 532 |
| PIII | insol.[d] | — | 523 | 532 |

Notes:
[a]Intrinsic viscosity determined in NMP at 30 ± 0.1° C.;
[b]Glass transition temperature ($T_g$) determined by DSC with heating rate of 10° C./min;
[c]The temperature at which 5% weight loss occurred on TGA thermogram obtained with heating rate of 10° C./min;
[d]Insoluble in NMP

EXAMPLE 7

General Procedure for the Preparation of BMI Blends

Amine-terminated hyperbranched polymers (PI and PII) were dissolved in NMP (1 wt %) and filtered. Exact weight of the filtrate (stock solution) was added into sample vials containing pre-weighed BMI and the resulting mixtures were agitated until the solutions became homogeneous. Commercially available 1,1'-(methylenedi-4,1-phenylene) bismaleimide was purified via column chromatography and used as the BMI component. The content of PI or PII in the blends were varied from 0 wt % to 3.75 wt % in both series of blends. The solvent from each of the blend/NMP solutions was removed under reduced pressure (1 mm Hg) for one week at 100° C. The solvent residue was monitored by FT-IR to ensure that none was present in the samples before thermal characterization(see Tables 2 and 3). This was confirmed by thermogravemetric analysis results.
Hyperbranched Polyamide/BMI Blends Since the end-groups in ether-amide (PI) and ether-quinoxaline (PII) hyperbranched polymers are amine functions, which can thermally react with maleimide via Michael addition without the generation of volatile by-products, they were chosen for blends studies. 1,1'-(Methylenedi-4,1-phenylene)bismaleimide (Aldrich; purified via column chromatography) was used as the BMI component. Thus, mixtures of BMI and PI or PII were dissolved in NMP and the solvent was removed under the reduced pressure (1 mm Hg) at 100° C. for 200 h. The DSC thermograms were run on powder samples after they had been heated to 200° C., cooled to 20° C., heated 320° C., cooled to 20° C., and heated to 320° C. with heating and cooling rates 10° C./min. The thermal analysis data are summarized in Tables 2 and Table 3. In the case of PI/BMI blends (Table 2), melting points of BMI decreased approximately 10–12° C. as compared to pure BMI. Heat of fusion ($\Delta H_1$) decreased as content of PI increased. It was observed that the peak temperature during curing increased to 262° C. (~9° C.>pure BMI) and then decreased to 247° C. (~5° C.>pure BMI) as the hyperbranched polymer PI content varied from 0.75% to 3.75%. Heats of curing were higher at all compositions, indicating that the large numbers of free amine at chain-ends indeed reacted with BMI. However, the amount of enthalpy detected during curing also showed a maximal value at relatively low PI content, 2.25 wt %.

In the case of PII/BMI blends, both melting points and heat of fusion ($\Delta H_f$) of BMI decreased as hyperbranched polymer PII content increased. It was observed that there was a dramatic reduction in the cure exotherm (~31% of $\Delta H_{exo}$ BMI) when only 0.75 wt % PII was present in the blend. At all other compositions, no cure exotherm was detected by DSC as the curing had already taken placed Table 2.

TABLE 2

Thermal properties of blends between PI and BMI

| PI Content (wt %) | Mp (° C.) | $\Delta H_f$ (J/g) | $T_{exo}$ (° C.) | $\Delta H_{exo}$ (J/g) |
|---|---|---|---|---|
| 0 (100% BMI) | 161.7 | 105.1 | 252.7 | −130 |
| 0.75 | 154.0 | 78.1 | 261.9 | −160 |
| 1.50 | 152.7 | 83.9 | 260.4 | −205 |
| 2.25 | 150.4 | 69.6 | 253.6 | −241 |
| 3.00 | 151.7 | 64.7 | 248.0 | −185 |
| 3.75 | 152.7 | 64.1 | 247.3 | −157 |

TABLE 3

Thermal properties of blends between PII and BMI

| PII Content (wt %) | Mp (° C.) | $\Delta H_f$ (J/g) | $T_{exo}$ (° C.) | $\Delta H_{exo}$ (J/g) |
|---|---|---|---|---|
| 0 (100% BMI) | 161.7 | 105.1 | 252.7 | −130 |
| 0.75 | 139.4 | 34.0 | 224.0 | −42 |
| 1.50 | 138.4 | 2.4 | — | — |
| 2.25 | 133.0 | 1.3 | — | — |
| 3.00 | 128.4 | 1.3 | — | — |
| 3.75 | — | — | — | — |

Having thus described exemplary embodiments of the present invention, it should be noted by those skilled in the art that the disclosures herein are exemplary only and that alternatives, adaptations and modifications may be made within the scope of the present invention.

We claim:

1. An amine-terminated hyperbranched quinoxaline-amide polymer having repeating units of the formula:

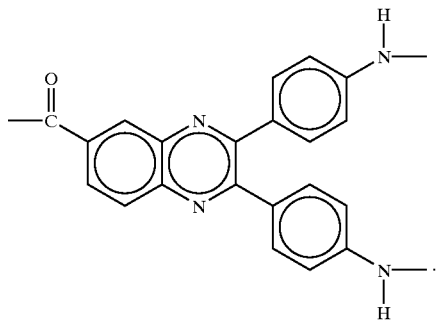

2. An amine-terminated hyperbranched quinoxaline-amide polymer having repeating units of the formula:

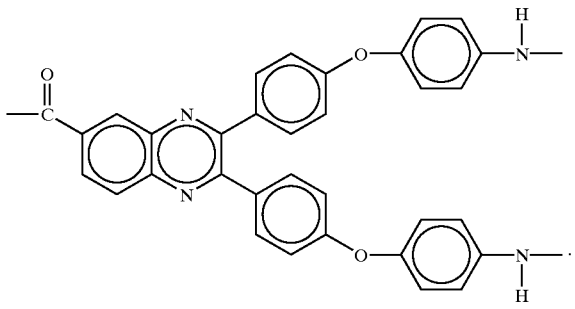

* * * * *